United States Patent
Tuan et al.

(10) Patent No.: US 10,579,123 B2
(45) Date of Patent: Mar. 3, 2020

(54) ADAPTIVE POWER MANAGEMENT IN A BATTERY POWERED SYSTEM BASED ON EXPECTED SOLAR ENERGY LEVELS

(71) Applicant: Samsara Networks Inc., San Francisco, CA (US)

(72) Inventors: Brian Tuan, San Francisco, CA (US); Kavya U. Joshi, San Francisco, CA (US); James Michael Rowson, San Francisco, CA (US); Justin J. Delegard, San Francisco, CA (US); James Austin Duffield, San Francisco, CA (US); Kong Kee Poon, San Carlos, CA (US); Christian Peter Almer, San Francisco, CA (US); John Bicket, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 15/870,599

(22) Filed: Jan. 12, 2018

(65) Prior Publication Data

US 2019/0220077 A1    Jul. 18, 2019

(51) Int. Cl.
*G06F 1/32*    (2019.01)
*G06F 1/26*    (2006.01)
(Continued)

(52) U.S. Cl.
CPC ............ *G06F 1/3212* (2013.01); *G06F 1/263* (2013.01); *G06F 1/32* (2013.01); *G06F 1/3203* (2013.01);
(Continued)

(58) Field of Classification Search
None
See application file for complete search history.

(56) References Cited

U.S. PATENT DOCUMENTS

| 5,917,433 A | 6/1999 | Keillor et al. | |
|---|---|---|---|
| 8,633,672 B2 * | 1/2014 | Jung | H02J 7/35 320/101 |

(Continued)

FOREIGN PATENT DOCUMENTS

WO    WO 2016/108420 A1 *   7/2016  ............. G01W 1/00

OTHER PUBLICATIONS

Dziuk B., Solar-Powered GPS Tracking Device XT-4800G, Feb. 16, 2017, 8 pages.*

(Continued)

*Primary Examiner* — Tanh Q Nguyen
(74) *Attorney, Agent, or Firm* — Nicholason De Vos Webster & Elliott LLP

(57) ABSTRACT

A method and a management server located in the cloud, for enabling adaptive power management in a gateway system, are described. The management server receives, from the gateway system powered by a rechargeable battery that is coupled with a solar power source, a location measurement indicating the location of the gateway system at a first time. The management server determines a solar profile indicating a measure of the power expected to be generated by the solar power source at the location during an interval of time that occurs after the first time. The management server transmits the solar profile to the gateway system causing the gateway system to determine based on a current battery level of the rechargeable battery and the solar profile an optimal power usage plan for the gateway system and to operate according to the optimal power usage plan during the interval of time.

14 Claims, 10 Drawing Sheets

(51) Int. Cl.
*G06N 5/04* (2006.01)
*G06F 1/3212* (2019.01)
*H02J 7/35* (2006.01)
*H02J 13/00* (2006.01)
*H02J 3/38* (2006.01)
*G06F 1/3234* (2019.01)
*G06F 1/3203* (2019.01)
*G06F 1/3206* (2019.01)
*H02J 3/00* (2006.01)

(52) U.S. Cl.
CPC ............ *G06F 1/325* (2013.01); *G06F 1/3206* (2013.01); *G06F 1/3234* (2013.01); *G06N 5/04* (2013.01); *H02J 3/383* (2013.01); *H02J 7/35* (2013.01); *H02J 13/0079* (2013.01); *H02J 2003/007* (2013.01)

(56) References Cited

U.S. PATENT DOCUMENTS

| | | | |
|---|---|---|---|
| 2006/0167591 A1* | 7/2006 | McNally | G06Q 50/06 700/291 |
| 2012/0235625 A1* | 9/2012 | Takehara | H01M 10/44 320/101 |
| 2014/0278108 A1* | 9/2014 | Kerrigan | G01W 1/10 702/3 |
| 2017/0263049 A1* | 9/2017 | MacDonald | G01S 3/7868 |
| 2017/0286838 A1* | 10/2017 | Cipriani | G06N 99/005 |
| 2017/0332199 A1* | 11/2017 | Elliott | H04W 4/023 |

OTHER PUBLICATIONS

"Solar Trax," Solar-Powered Tracking of Valuable Assets, downloaded from https://www.gofleet.com/wp-content/uploads/2016/10/SolarTraxSpecSheet.pdf, 2017, 4 pages.

"Solar-Powered Trailer Tracking," The Industry's Most Trusted Trailer Telematics Solution, ORBCOMM, 2017, 2 pages.

Solar Trax, Solar Powered Asset Tracking Solution, gofleet, downloaded from https://www.gofleet.com/product/xirgo-asset-tracking, 2017, 2 pages.

Dziuk B., "Solar-Powered GPS Tracking Device XT-4800G," Solar Powered Device, Feb. 16, 2017, 14 pages.

"NextPoint," Titan GPS Elite Reseller, downloaded from https://www.nextpointgps.com, 2017, 8 pages.

"Solar Powered GPS Tracker, know where your assets are at all times," The Industry's most innovative solar powered device for asset and tracking, Wirelesslinks, Piccolo ATX2S, 2017, 8 pages.

* cited by examiner

RECEIVE, FROM A GATEWAY SYSTEM POWERED BY A RECHARGEABLE BATTERY THAT IS COUPLED WITH A SOLAR POWER SOURCE, A LOCATION READING INDICATING THE LOCATION OF THE GATEWAY SYSTEM AT A FIRST TIME
510

DETERMINE A SOLAR PROFILE INDICATING A MEASURE OF THE POWER EXPECTED TO BE GENERATED BY THE SOLAR POWER SOURCE AT THE LOCATION DURING AN INTERVAL OF TIME THAT OCCURS AFTER THE FIRST TIME
520

TRANSMIT THE SOLAR PROFILE TO THE GATEWAY SYSTEM CAUSING THE GATEWAY SYSTEM TO DETERMINE BASED ON A CURRENT BATTERY LEVEL OF THE RECHARGEABLE BATTERY AND THE SOLAR PROFILE AN OPTIMAL POWER USAGE PLAN FOR THE GATEWAY SYSTEM AND TO OPERATE ACCORDING TO THE OPTIMAL POWER USAGE PLAN DURING THE INTERVAL OF TIME
530

Fig. 5

DETERMINE A SOLAR PROFILE INDICATING A MEASURE OF THE POWER EXPECTED TO BE GENERATED BY THE SOLAR POWER SOURCE AT THE LOCATION DURING AN INTERVAL OF TIME THAT OCCURS AFTER THE FIRST TIME
520

DETERMINE, BASED ON THE LOCATION OF THE GATEWAY SYSTEM, ONE OR MORE POWER MEASURES PREVIOUSLY RECORDED
610

THE ONE OR MORE POWER MEASURES PREVIOUSLY RECORDED WERE RECORDED WITHIN A PREDETERMINED RADIUS OF THE LOCATION OF THE GATEWAY SYSTEM AND WITHIN A PREDETERMINED TIME RANGE OF A START TIME OF THE INTERVAL OF TIME
612

THE ONE OR MORE POWER MEASURES WERE PREVIOUSLY RECORDED AT ONE OR MORE LOCATIONS THAT HAVE AN ASSOCIATED SOLAR INDEX THAT IS EQUIVALENT TO A SOLAR INDEX OF THE LOCATION OF THE GATEWAY SYSTEM
614

THE ONE OR MORE LOCATIONS ARE AT A SAME LATITUDE AS THE LOCATION OF THE GATEWAY SYSTEM
616

DETERMINE, BASED ON A FORECASTING MODEL AND THE DETERMINED ONE OR MORE POWER MEASURES PREVIOUSLY RECORDED, ONE OR MORE POWER MEASURES EXPECTED TO BE GENERATED BY THE SOLAR POWER SOURCE DURING THE INTERVAL OF TIME
620

DETERMINE FOR EACH ONE OF THE ONE OR MORE POWER MEASURES EXPECTED TO BE GENERATED BY THE SOLAR POWER SOURCE AN ASSOCIATED CERTAINTY COEFFICIENT
630

ADAPTIVE POWER MANAGEMENT IN A BATTERY POWERED SYSTEM BASED ON EXPECTED SOLAR ENERGY LEVELS

FIELD

Embodiments of the invention relate to the field of battery power management, and more specifically, to enabling adaptive power management in a system based on expected solar energy levels.

BACKGROUND

Battery-powered systems must commonly trade off system performance and battery power management. Most systems alternate operation between a low-battery mode or a regular-battery mode. A battery power level threshold is predetermined and if the battery level of the system is measured to be below the predetermined threshold, the system enters a low-power state, in which performance is sacrificed to maintain sufficient battery levels. Alternatively, when the battery level of the system is measured to be above the predetermined threshold, then the system operates in a performant manner. The predetermined threshold is typically set statically and in a conservative manner particularly when it is uncertain when battery power of the system may be replenished by an external power source.

Solar panels can be used to extend the operating life of battery-powered systems by replenishing the charge of the battery. Several power management techniques change the performance characteristics of a system depending on which energy source (specifically, battery vs. solar) is primarily used, exist.

Even though solar panels are currently used to extend the operating time of existing battery-powered systems, such systems still rely on a double power mode of operations that is dependent on the type of power source that is used to power the system (i.e., low power mode when the only source of power is the solar power source, and a normal/performant power mode when there is a different power source).

SUMMARY

One general aspect includes a method, in a management server located in the cloud, of enabling adaptive power management in a gateway system, the method including: receiving, from the gateway system powered by a rechargeable battery that is coupled with a solar power source, a location reading indicating a location of the gateway system at a first time; determining a solar profile indicating a measure of power expected to be generated by the solar power source at the location during an interval of time that occurs after the first time; and transmitting the solar profile to the gateway system causing the gateway system to determine based on a current battery level of the rechargeable battery and the solar profile an optimal power usage plan for the gateway system and to operate according to the optimal power usage plan during the interval of time.

One general aspect includes a management server device located in the cloud for enabling adaptive power management in a gateway system, the management server device including: a non-transitory computer readable storage medium to store instructions; and a processor coupled with the non-transitory computer readable storage medium to process the stored instructions to receive, from the gateway system powered by a rechargeable battery that is coupled with a solar power source, a location reading indicating a location of the gateway system at a first time; determine a solar profile indicating a measure of power expected to be generated by the solar power source at the location during an interval of time that occurs after the first time; and transmit the solar profile to the gateway system causing the gateway system to determine based on a current battery level of the rechargeable battery and the solar profile an optimal power usage plan for the gateway system and to operate according to the optimal power usage plan during the interval of time.

One general aspect includes a method, in gateway system powered by a rechargeable battery that is coupled with a solar power source, of enabling adaptive power management, the method including: transmitting a location reading indicating a location of the gateway system at a first time; receiving from a management server a solar profile indicating a measure of power expected to be generated at the location during an interval of time that occurs after the first time by the solar power source; determining based on a current battery level of the rechargeable battery and the solar profile an optimal power usage plan for the gateway system; and operating according to the optimal power usage plan during the interval of time.

One general aspect includes a gateway system powered by a rechargeable battery that is coupled with a solar power source, for enabling adaptive power management, the gateway system including: a non-transitory computer readable storage medium to store instructions; and a processor coupled with the non-transitory computer readable storage medium to process the stored instructions to: transmit a location reading indicating the location of the gateway system at a first time; receive from a management server a solar profile indicating a measure of power expected to be generated at the location during an interval of time that occurs after the first time by the solar power source; determine based on a current battery level of the rechargeable battery and the solar profile an optimal power usage plan for the gateway system; and operate according to the optimal power usage plan during the interval of time.

BRIEF DESCRIPTION OF THE DRAWINGS

The invention may best be understood by referring to the following description and accompanying drawings that are used to illustrate embodiments of the invention. In the drawings:

FIG. 5 illustrates a flow diagram of exemplary operations for enabling adaptive power management in a battery powered gateway system based on expected solar energy level, in accordance with some embodiments.

FIG. 6 illustrates a flow diagram of exemplary operations for determining a solar profile indicating a measure of the power expected to be generated by the solar power source at the location during an interval of time, in accordance with some embodiments.

DESCRIPTION OF EMBODIMENTS

Figure 1:
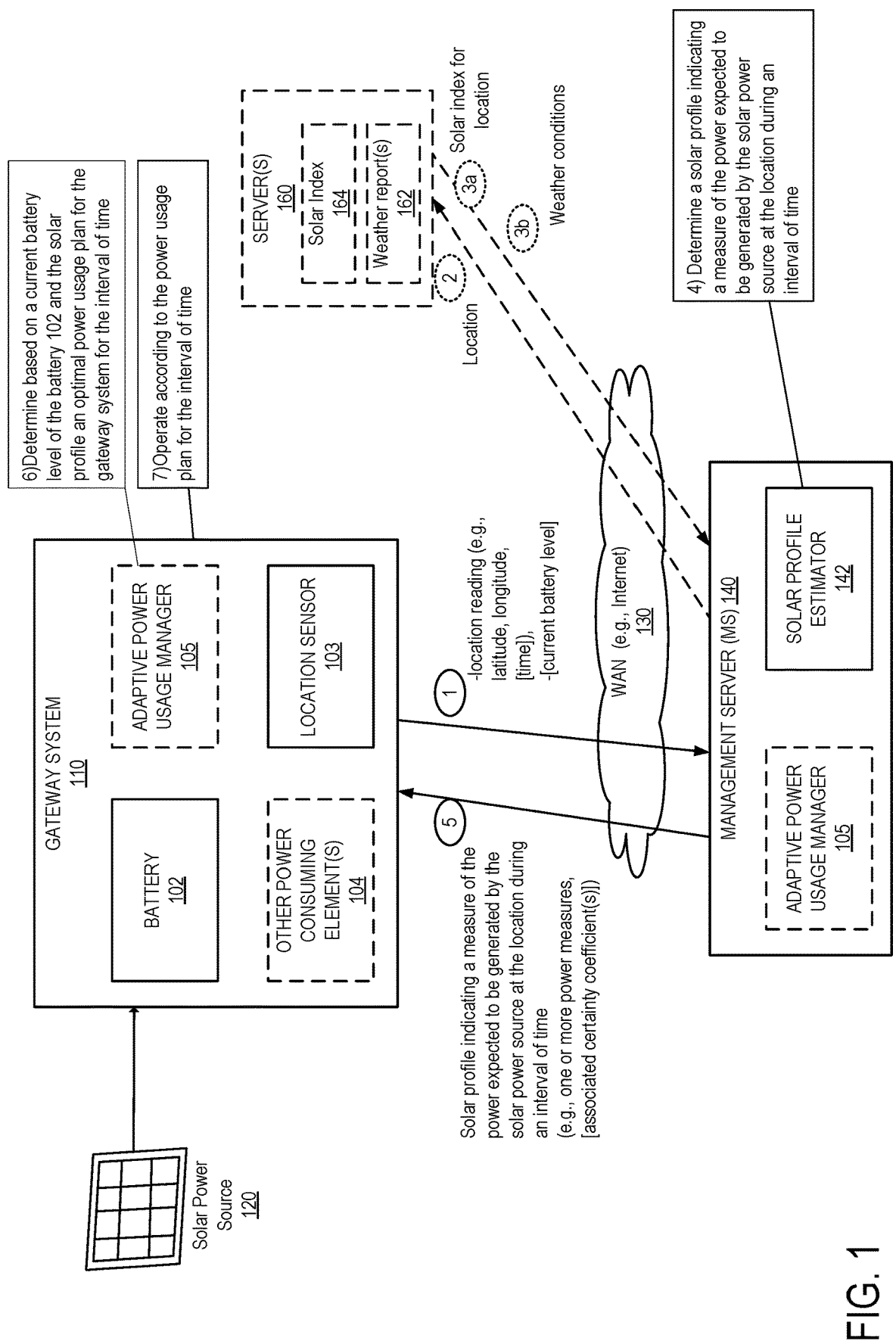
FIG. 1 illustrates a block diagram of an exemplary solar powered system for enabling adaptive power management in a battery powered gateway system based on expected solar energy level, in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

According to some embodiments, a method and a management server located in the cloud, for enabling adaptive power management in a gateway system, are described. In some embodiments, the management server receives, from the gateway system powered by a rechargeable battery that is coupled with a solar power source, a location measurement indicating the location of the gateway system at a first time. The management server determines a solar profile indicating a measure of the power expected to be generated by the solar power source at the location during an interval of time that occurs after the first time. The management server transmits the solar profile to the gateway system causing the gateway system to determine based on a current battery level of the rechargeable battery and the solar profile an optimal power usage plan for the gateway system and to operate according to the optimal power usage plan during the interval of time.

FIG. 1 illustrates a block diagram of an exemplary solar powered system for enabling adaptive power management in a battery powered gateway system based on expected solar energy level, in accordance with some embodiments. The solar powered system includes a gateway system 110 that is coupled with a solar power source 120, and a management server 140. In some embodiments, the gateway system can be located on a mobile asset (not illustrated) that has an unreliable access to an additional power source (e.g., battery of a vehicle, etc.). In some embodiments, the mobile asset is an unpowered vehicle (such as a trailer). In some embodiments, the mobile asset may be a powered system, however the gateway system mounted on the mobile asset may not have a permanent or constant access to the power source of the mobile asset. In some embodiments, the gateway system is not plugged to the power source of the mobile asset, while in other embodiments the gateway system may have an intermittent connection to the power source of the mobile asset.

The mobile asset can be part of a fleet of mobile assets tracked by a fleet management system that includes the gateway system and the management server. The mobile asset is typically located remotely from the management server 140 and may change location over a period of time. The mobile asset can be a trailer coupled with a tractor. The mobile asset can be a tractor, a tow truck, a semi-truck, a light or heavy truck or any other type of vehicle that is operative to be coupled with and pull a trailer. Alternatively, the mobile asset can be a car, a van, a bus, a specialized vehicle or any other type of vehicle.

The gateway system 110 is an electronic device and is operative to be coupled with the management server 140 through a Wide Area Network (WAN) 130. The connection to the WAN 130 is a wireless connection (e.g., WiFi, cellular connection, etc.). In some embodiments, the gateway system 110 and the management server 140 may be subject to an intermittent connectivity with the WAN. The gateway system 110 is operative to record or obtain data related to the vehicle on which it is mounted and transmit the data to the management server 140. The gateway system 110 transmits data indicative of a state of the vehicle. For example, the gateway system 110 may transmit location readings indicating the location of the mobile asset on which it is mounted. In some embodiments, the data further include additional sensor measurements for the mobile asset (such as temperature, humidity, etc.). In some embodiments, the gateway system 110 is implemented as described in further details with reference to FIG. 10. The gateway system 110 is coupled with the solar power source 120. The solar power source converts the energy from sunlight into electricity. The solar power source 120 may be part of the gateway system 110 and located within the same physical device. In other embodiments, the solar power source 120 is coupled with the gateway system 110 without being included in the same physical device. The gateway system 110 includes a battery 102. The battery is a rechargeable battery that receives power from the solar power source and is used to power the gateway system. In some embodiments, the gateway system 110 includes a location sensor 103. The location sensor 103 is operative to determine the location of the gateway system 110. For example, the location sensor 103 can be a Global Positioning System (GPS) sensor that records GPS coordinates. In some embodiments, the location sensor can be located outside of the gateway system 110 and coupled with the gateway system 110 through a wireless protocol (e.g., a short range wireless communication protocol). In some embodiments, the gateway system 110 also includes an adaptive power usage manager 105 that is operative to determine an optimal power usage plan for the gateway system during an interval of time. Each of the elements of the gateway system 110 (except the battery 102) are power consuming components that operate with power received from the battery 102. In some embodiments, the gateway system 110 may include additional power consuming elements 104 (e.g., sensor devices, communication interfaces, etc.).

The management server 140 is a cloud-based server operative to receive data from one or more gateway systems (e.g., the gateway system 110). The data received from the gateway systems is used by the solar profile estimator 142 of the management server 140 to determine a solar profile indicating a measure of the power expected to be generated by the solar power source 120 at the location of the gateway system 110 during an interval of time. The solar profile causes the gateway system 110 to adapt its power consumption based on the solar profile. In some embodiments, the management server 140 includes an adaptive power usage manager 105 that is to determine an optimal power usage plan for the gateway system 110 based on a current battery level of the battery 102. In some embodiments, the management server 140 is implemented as described in further details with reference to FIG. 8.

In some embodiments, the gateway system 110 may be coupled with one or more wireless sensing devices (not illustrated). The wireless sensing devices (WSDs) are electronic devices that include one or more sensors for detecting physical events (e.g., temperature, humidity, barometric pressure, CO2 concentration, acceleration, pressure, sound, movement, etc.) and recording sensor measurements in response to the detection of these physical events. The wireless sensing devices can be small electronic devices that are attachable to an object for recording sensor information related to physical events related to the object (e.g., recording changes in temperature, movement of an object (e.g., a door being closed/opened), sudden accelerations of a vehicle, etc.). The WSDs can then store the sensor measurements related to physical events detected over a period of time. The WSDs may record sensor measurements at regular intervals of time (e.g., the WSDs may detect the temperature of a room, or an object (e.g., refrigerator, food product), and record corresponding temperature measurements every N seconds or minutes). The sensor measurements are stored in a non-transitory computer readable medium of the WSDs. Each of the WSDs is operative to be coupled to a gateway system (e.g., gateway system 110) and establish a communication channel to transfer the recorded sensor measurements. In some embodiments, each of the WSDs can connect to the gateway system through a wireless communication interface (e.g., Bluetooth Low Energy (BLE), WiFi). Thus, the WSDs are operative to detect a gateway system and negotiate a connection to the gateway. In some embodiments, the WSDs are used to measure sensor measurements indicating current values of one or more driving behavior parameter to be monitored for the vehicle during a route. The WSDs can be implemented as described with reference to FIG. 11.

At operation 1, the management server 140 receives, from the gateway system 110, a location measurement indicating the location of the gateway system at a first time. The location reading is a sensor measurement recorded by the location sensor 103. For example, the location sensor can be a Global Positioning System (GPS) sensor and the location reading includes GPS coordinates. The location reading indicates a location of the gateway system at a given time. In some embodiments, the location reading indicates a location of a mobile asset on which the gateway system 110 is mounted. In some embodiments, the gateway system 110 transmits several location readings that the location of the mobile asset on which the gateway system 110 is mounted at one or more times. For example, the gateway system 110 may transmit 10 location readings recorded in the last 5 minutes. The location readings indicate current location of the gateway system 110. In some embodiments, each location reading can include a longitude, latitude and an associated time (e.g., a timestamp). The time can indicate the time at which the latitude and longitude were recorded by the location sensor; alternatively the timestamp can indicate the time at which the latitude, longitude are transmitted from the gateway system 110 or received by the management server 140.

At operation 4, the solar profile estimator 142 of the management server 140 determines a solar profile indicating a measure of the power expected to be generated by the solar power source at the location during an interval of time that occurs after the first time. The interval of time can vary from few hours to few weeks. The solar profile is determined based on the location of the gateway system 110 as indicated by the location reading at the first time. In some embodiments, the solar profile may also be determined based on a solar index of the location and/or the weather condition expected for that location during the interval of time. For example, the management server 140 may transmit, operation 2, the location of the gateway system 110 to one or more other servers (offering weather reports services 162, and/or solar index information service 164) and obtain a solar index for the location (operation 3a) and/or the weather condition (operation 3b). In some embodiments, in addition to a solar profile, the management server 140 also transmits one or more certainty coefficients associated with this solar profile indicating a level of confidence in the solar profile.

In some embodiments, the management server 140 transmits, at operation 5, the solar profile to the gateway system 110. Upon receipt of the solar profile, the gateway system 110 determines, at operation 6, based on the solar profile and a current battery level of the rechargeable battery an optimal power usage plan for the gateway system. In some embodiments, the gateway system 110 also uses the certainty coefficients associated with the solar profile to determine the optimal power usage plan. The gateway system then operates, at operation 7, according to the optimal power usage plan during the interval of time.

In another embodiment, the management server 140, in addition to receiving the location reading, receives a current battery level of the battery 102. In this embodiment, in addition to determining the solar profile, the management server 140 may also determine an optimal power usage plan for the gateway system 110 (e.g., via the adaptive power usage manager 105 that can optionally be located in the management server 140). In some embodiments, the management server 140 also uses the certainty coefficients associated with the solar profile to determine the optimal power usage plan. The optimal power usage plan ensures that the gateway system operates during the interval of time above a predetermined minimum energy threshold that guarantees a reliable operation of the gateway system.

The embodiments described above enable adapting the operation modes of the gateway system 110 in a more dynamic way when compared to conventional solar powered system. Instead of relying only on the type of power source that the gateway system is coupled with, or relying only on a current level of the battery 102, the gateway system 110 takes into account the expected power to be generated by the solar power system 120 in the future. The gateway system 110 operates according to an optimal power usage plan for an interval of time, where the power usage plan is determined based on the power that is expected to be generated by the solar power source during that interval of time. For example, the gateway system 110 may operate in a more efficient and performant mode even if a battery level of the battery were below a predetermined minimum threshold when the power expected to be generated during the interval of time would allow a replenishment of the battery in a near future. Alternatively, the gateway system 110 may operate in a more conservative mode even if the battery level of the battery were above the predetermined threshold when the power expected to be generated during the interval of time would not allow a replenishment of the battery in a near future. Thus, the gateway system 110 can use more power in the present to take advantage of availability of power in the future.

The embodiments described herein can be used in a fleet tracking system. For example, gateway systems mounted on trailers enable a trailer tracking system. In this scenario, the location sensor 103 records location and telemetry data that is reported over a wireless connection to a database stored on the management server 140 multiple times per second. The gateway system 110 may obtain a solar profile from the management server 140 at a specified period (every few hours, every day, every week, etc.) to determine the optimal power usage plan for the location sensor. For example, the optimal power usage plan may cause a determination of a number of location readings that are to be recorded by the location sensor during an interval of time (e.g., every second, every minute, every hour, etc.). As trailers move frequently, the present embodiments enable the gateway system of a given trailer to adapt to a solar energy expected to be received in a given location (even if the trailer has never been located in that location before).

The solution presented herein allows for easier installation of gateway systems on mobile assets as the gateway systems are no longer required to be coupled with an external power source (such as a battery of the mobile asset or a vehicle on which the gateway system is mounted). Often, accessing power on a mobile asset is difficult and can cause problems with keeping the mobile asset weather proof. In addition, since in the solution presented herein the gateway system 110 is isolated from the power source of the mobile asset, the gateway system is not affected by problems that occur with the power of the mobile asset and the mobile asset is also protected from the gateway system. Thus, keeping the gateway system isolated from the mobile asset's power prevents the gateway system from using too much of the mobile asset's power.

Figure 2:
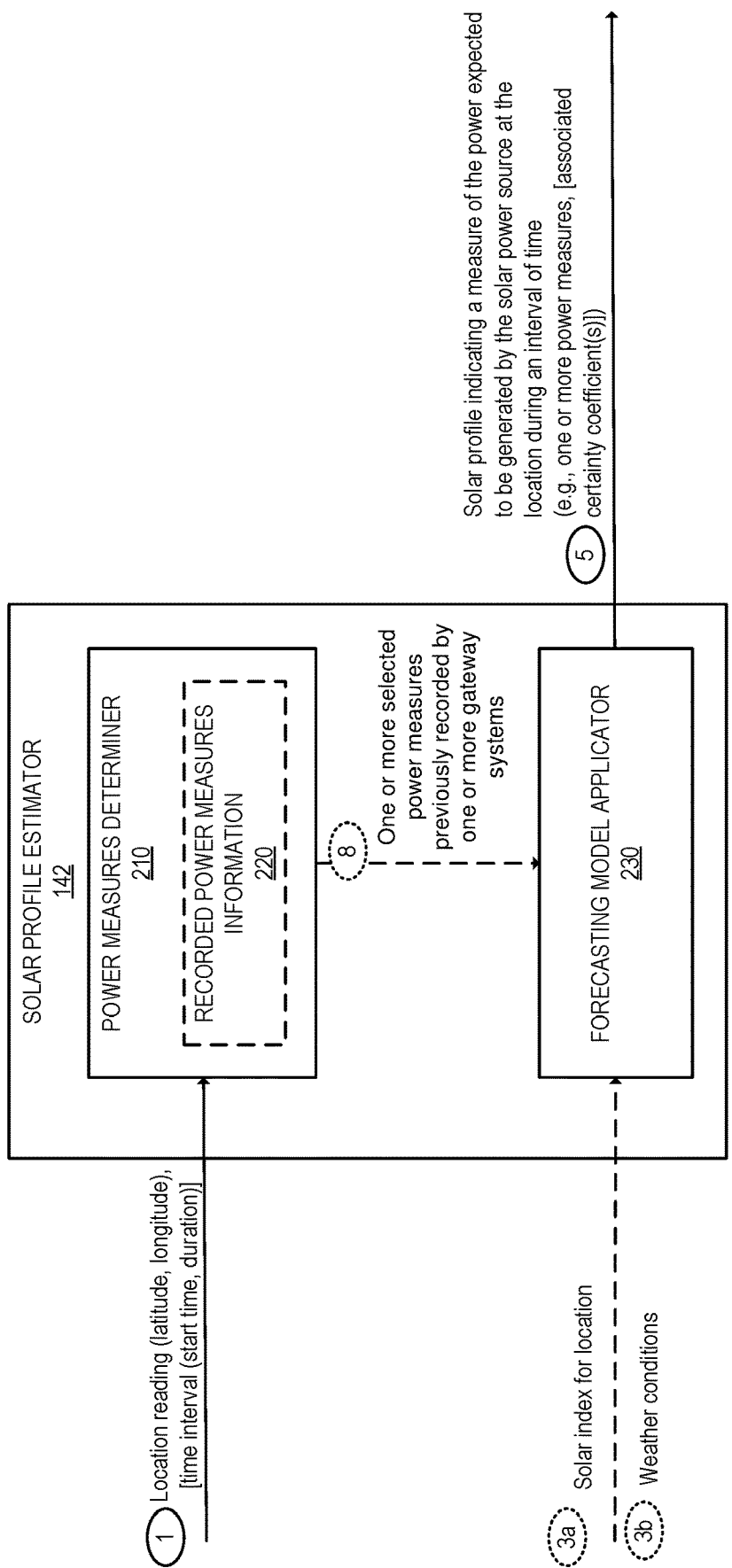
FIG. 2 illustrates an exemplary solar profile estimator for determining a solar profile indicating a measure of the power expected to be generated by the solar power source at the location during an interval of time, in accordance with some embodiments.

FIG. 2 illustrates an exemplary solar profile estimator for determining a solar profile indicating a measure of the power expected to be generated by the solar power source at the location during an interval of time, in accordance with some embodiments. The solar profile estimator 142 includes a power measures determiner 210 and a forecasting model applicator 230.

At operation 1, the power measures determiner 210 receives the location reading indicating the location of the gateway system 110 at a first time. In some embodiments, the power measurements determiner 210 can also include an interval of time for which a solar profile is to be determined. In other embodiments, the interval of time is predetermined and is not received as an input. The interval of time can be any interval ranging from few minutes to few days. For example, the interval of time can be a day. The length of the interval of time may affect certainty coefficients that are determined for a solar profile. The interval of time can also be determined dynamically at the solar profile estimator 142. The interval of time can be determined based on a time that the gateway system 110 is expected to remain at the location. For example, the management server 140 may include information about routes or stop locations scheduled for a mobile asset on which the gateway system is mounted and the interval of time can be determined based on this information. In other embodiments, the interval of time can be determined based on the power usage plan that according to which the gateway system 110 is operating.

The power measures determiner 210 determines one or more power measures previously recorded by one or more gateway systems. In some embodiments, the power measures determiner 210 includes recorded power measures information 220. In some embodiments, the recorded power measures information 220 is external to the solar profile estimator 142. In other embodiments, the solar profile estimator 142 does not have access to recorded power measures information 220 at all, as no data is available yet. The recorded power measures information 220 includes a set of power measures that were generated by one or more solar power sources coupled with one or more gateway systems at various locations and times. The recorded power measures information 220 can also include for each power measures, a time and date at which the measure was generated by a respective solar power source, and a location at which the power measure was generated. The location can be a location reading from the location sensor of the gateway system. In some embodiments, the recorded power measures information 220 is generated as described in further details with respect to FIGS. 3-4.

The power measures determiner 210 receives the location reading and determines based on the time associated with the location reading, a set of power measures. The power measures are selected from the set of previously recorded power measures stored in the recorded power measures information 220. In some embodiments, the selected power measures include measures that were previously recorded within a predetermined radius of the location of the gateway system 110 and within a predetermined time range of a start time of the interval of time for which the solar profile is to be determined. The predetermined radius can be any distance from the location readings for the gateway system 110 (e.g., within 250 m, within 2 m, within 1 km). The predetermined radius can be determined based on an analysis of the multiple power measures recorded. The analysis can determine the perimeter around a given location for a gateway system for which power measures are similar for a given time and day of the year. The predetermined time range can be an interval of time for which the power measures are expected to remain substantially the same. For example, the predetermined time range can be few milliseconds to few seconds. Other examples of time range can be used without departing from the scope of the present invention.

In some embodiments, the selected power measures include measures that were previously recorded at one or more locations that have an associated solar index that is equivalent to a solar index of the location of the gateway system indicated by the location reading. In these embodiments, the selected power measures may have been recorded by gateway systems that were located at locations different from the location of the gateway system 110. These locations have a similar solar index than the solar index for the location of the gateway system 110. For example, each one of the locations of the selected power measures can have a solar index that is within a predetermined range from the solar index of the location of the gateway system 110. In some embodiments, the selected power measures include measures that were previously recorded at one or more locations that have the same latitude as the latitude of the location of the gateway system 110.

In some embodiments, the selected power measures can include only power measures that were previously recorded within a predetermined radius of the location of the gateway system 110 and within a predetermined time range of a start time of the interval of time for which the solar profile is to be determined, only measures previously recorded at one or more locations that have an associated solar index that is equivalent to a solar index of the location of the gateway system, or a combination of both (previously recorded within the predetermined radius and the predetermined time range or with a solar index that is equivalent). In some embodiments, the power measures determiner 210 determines whether there are any power measures that were previously recorded within a predetermined radius of the location of the gateway system 110 and within the predetermined time range of the start time. If there are such measures, the power measures determiner 210 selects those measures as the selected power measures (operation 8). If there aren't any such measures, the power measures determiner 210 may determine measures previously recorded at locations that have an associated solar index that is equivalent to a solar index of the location of the gateway system as the selected power measures.

In some embodiments, the selected power measures were recorded at the same time of day and the same time of the year as the time and day of the year at which the location of the gateway system 110 is received. For example, when the location of the start time of the time interval is on the first day of the first month of the year (January 1$^{st}$), the selected power measures were recorded on a first day of the first month of a year.

In some embodiments, the recorded power measure information 220 includes additional information about the solar power source and the recorded power measures. For example, each power measure can be stored with one or more of the following information: the type of solar power source that generates the power measure (e.g., type of solar panel), age of the solar power source (e.g., time since installation on the mobile asset, etc.), location of the power source on the mobile asset, orientation of solar power source, location of mobile asset relative to structures that obscure the sun, the weather conditions at the location and at that time, etc. In this embodiment, the selection of the power measures based on the location of the gateway system 110 and the time is based on one or more of these additional information. For example, the management server 140 may also have access to information about the location of the power source 120 on the mobile asset or relative to the gateway system 110, the type of solar power source used (if several types of solar power source can be used), the age of the solar power source, the orientation of the solar power source 120, and/or the weather conditions etc. and use this information to select from the recorded power measures information 220 the selected power measures.

The result of the operation performed in the power measures determiner 210 is the set of selected power measures (8). The forecasting model application 230 uses the selected power measures to determine a solar profile $P_{inp}(t)$, indicating a measure of the power expected to be generated by the solar power source 120 at the location of the gateway system 110 during the interval of time T=[t0,t1] (or the power expected to be input to the gateway system from the solar power source 120). The solar profile $P_{inp}(t)$ includes one or more power measures expected to be generated by the solar power source during the interval of time T. In some embodiments, the solar profile is a discrete time series of power measures values during the interval T. In some embodiments, the solar profile is a continuous function of time t over the interval T. Several models can be used as the forecasting model applicator 230. Exponentially Weighted Moving Average (EWMA) forecast model, an autoregressive integrated moving average (ARIMA) model, or an autoregressive moving average (ARMA) model are exemplary models that can be used to determine the solar profile.

In some embodiments, the forecasting model applicator 230 takes into account the selected power measures, if available, the time of the day, a solar index (3$a$) for the location of the gateway system 110, and/or a weather pattern (3$b$) for the location of the gateway system 110. In some embodiments, if there aren't any selected power measures, the forecasting model application 230 may query an external solar map for values for the location of the gateway system 110 for the past n days and determines the solar profile for the gateway system 110.

In some embodiments, the forecasting model applicator 230 may assign to the solar profile one or more certainty coefficients. In some embodiments, a single certainty coefficient is associated with the solar profile for the entire interval of time. In other embodiments, different certainty coefficients are associated with the solar profile, each coefficient related to a different sub-interval of the interval of time. In some embodiments, a certainty coefficient is determined for each one of the power measures expected to be generated by the solar power source that form the solar profile. Each certainty coefficient can be a value between [0, 1] that represents the confidence in the accuracy of the solar profile during the corresponding sub-interval of time.

The certainty coefficients may depend on the type of power measures selected at operation 8 and/or the date at which these power measures were recorded. For example, the certainty coefficient of a solar profile that is determined based on power measures recorded by the gateway system 110 would be greater than a certainty coefficient of a solar profile that is generated based on power measures from gateway systems others than the gateway system 110. In another example, the certainty coefficient of a solar profile that is determined based on power measures recorded at the location of the gateway system 110 would be greater than a certainty coefficient of a solar profile that is generated based on power measures from different locations that have a solar index similar to the solar index of the location of the gateway system 110. Further, the certainty coefficient may depend on the sub-interval to which it corresponds. For example, when the solar profile is determined for an interval T=[t0, t1] including sub-intervals [t0, t2], [t2,t3] and [t3, t1], where t0<t2<t3<t1, the certainty coefficients for the solar profile can be determined such that a high certainty is assigned to the solar profile during the first time interval [t0, t2], then the certainty coefficient would be reduced for further out time intervals such as the second interval [t2,t3] and [t3,t1]. In a non-limiting example, the first certainty coefficient can be 1 for the solar profile between [t0, t2] (e.g., t0 indicates a current time, t2 is 3 h after the current time); the second certainty coefficient can be 0.9 for the solar profile between [t2, t3] (e.g., t3 is 6 h after the current time); the third certainty coefficient can be 0.8 for the solar profile between [t3, t1] (e.g., t1 is 9 h after the current time). Other examples can be contemplated without departing from the scope of the present invention.

While in some embodiments, the solar profile can be determined based on past power measurements recorded for the gateway system 110, in other embodiments, the solar profile is determined based on past power measurements recorded by gateway systems others than the gateway system 110. In some embodiments, the solar profile can be determined based on past power measurements recorded for the gateway system 110 and other gateway systems. The embodiments described herein allow for prediction of an expected solar performance for the gateway system 110 at its current location (i.e., the expected power to be generated by the power source 120) even without information on prior power measures from the gateway system 110 at that location. The performance of the gateway system 110 continually improves, as more data (e.g., power measures) is stored into the recorded power measures information 220, enabling the determination of more accurate solar profiles.

Figure 3:
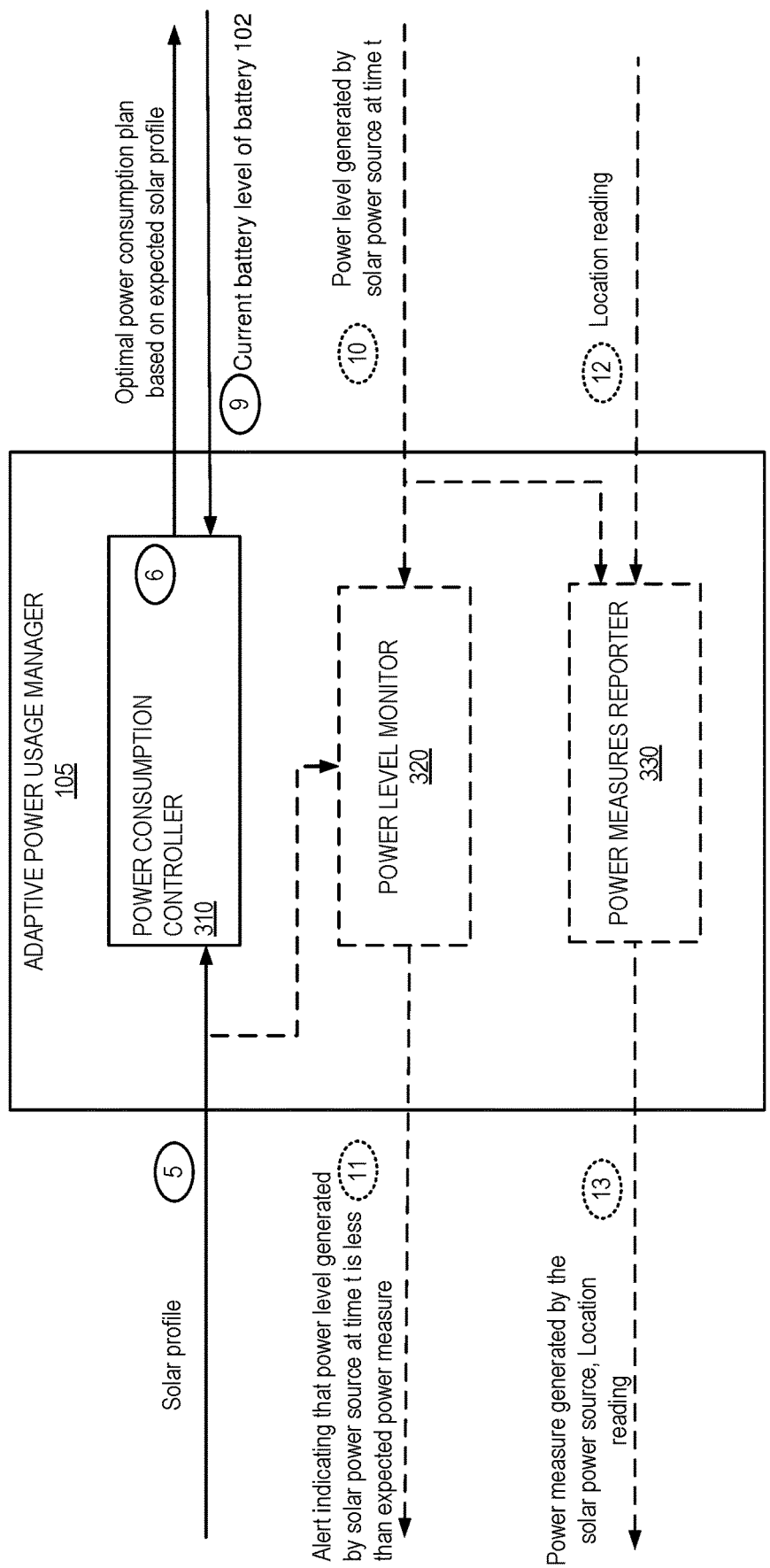
FIG. 3 illustrates an exemplary power consumption manager for determining an optimal power consumption plan, in accordance with some embodiments.

FIG. 3 illustrates an exemplary power consumption manager for determining an optimal power consumption plan, in accordance with some embodiments. In some embodiments, the adaptive power usage manager 105 is located in the gateway system 110. In other embodiments, the adaptive power usage manager 105 is located in the management server 140. The adaptive power usage manager 105 is operative to determine an optimal power consumption plan for the gateway system 110 based on the solar profile for the interval of time. The adaptive power usage manager 105 includes a power consumption controller 310, an optional power level monitor 320, and an optional power measures reporter 330.

The power consumption controller 310 receives the solar profile (operation 5) and a current battery level of the battery 102 (operation 9) and determines (operation 6) an optimal power usage plan for the gateway system 110 for the interval of time [t0, t1].

The power usage plan includes power measures, $P_{use}(t)$, which indicate the amount of power to use at time t from the interval T=[t0, t1] by the gateway system 110. In some embodiments, the power usage plan may result in charging the battery 102, which would increase the operating time of the gateway system 110 and enable power to be drawn from the battery at a later time. In some embodiments, the power usage plan may result in depleting the battery 102, and increasing the performance of the gateway system 110.

Several approaches can be used to determine the power usage plan (i.e., $P_{use}(t)$ for t0<t<t1). In some embodiments, the power usage plan is determined based on: 1) the $E_{t0}$, which is the battery level of the battery 102 at time t0; 2) $P_{min}(t)$, which is the minimum power needed by the device at an arbitrary time t; 3) $E_{thresh}(t)$, which is the low energy threshold (i.e., if the battery level of battery 102 falls below this threshold, then the gateway system 110 reduces to the lowest power consumption operating state); and $P_{inp}(t)$, which is the generated solar profile for the interval of time [t0, t1].

In one embodiment, a flat power use term C>0 is added to the minimum energy usage, as per the equation below:

$$P_{use}(t)=P_{min}(t)+C \ldots \quad (1)$$

C is maximized under the following minimum energy threshold constraint:

$$E_{t0}+\int_{t0}^{t}[P_{inp}(t')-P_{use}(t')]dt' \geq E_{thresh}(t) \ldots \quad (2)$$

for all t0<t<t1
And $P_{use}(t)$ is determined based on equation (1).

Several other approaches can be used for determining the power usage plan without departing from the scope of the present embodiments.

The optimal power usage plan ensures that the gateway system operates during the interval of time above the predetermined minimum energy threshold and that the power stored in the battery is used in a most efficient manner taking into account the expected power to be generated by the solar power system 120 in the future.

In some embodiments, the optimal power usage plan is used to determine configuration parameters of different components (e.g., sensors) of the gateway system (e.g., such as the frequency of measurements to be recorded, duration of the measurements, precision of the measurements, etc.), and/or to control power consumption of other aspects of the gateway system 110. For example, the optimal power usage plan is used to determine the frequency, the duration and the precision of operation of the location sensor 103. In some embodiments, the power usage plan is also used to determine how often and for how long the gateway system 110 is to connect to the management server 140; how and when to connect to and/or pull data from other wireless devices (e.g., WSDs), as well as other functionalities of the gateway system 110.

In some embodiments, each component of the gateway system 110 can operate in at least two energy modes of operations. For example, the energy modes can include a low energy mode in which the energy consumption of the component is lowered to a minimum, and a high energy mode in which the energy consumption of the component is increased to a maximum. In some embodiments, one or more components of the gateway system 110 may operate in at least one additional intermediary mode.

An exemplary gateway system 110 includes the location sensors with two energy modes (e.g., low energy mode yields location reading precision to a 250 meter radius, and a hi energy mode yields location reading precision to a 10 meter radius); a cellular communication interface with two energy modes (e.g., low energy mode that causes the gateway system 110 to request solar profiles from the management server 140 through the cellular communication interface once per day, and high energy mode causes the gateway system 110 to request solar profiles from the management server 140 through the cellular communication interface once per hour; and a short range wireless communication protocol interface with two energy modes (e.g., a low energy mode that causes the gateway system 110 to listens for packets from paired devices in 1 minute windows at a predetermined interval, and a high energy mode that causes the gateway system 110 to listens for packets from paired peripherals in a 5 minute window at the same predetermined interval).

The energy modes of operations of each component determine parameters of operations of each component. The power usage plan determined based on a solar profile for an interval of time [t0, t1] determines the mode of operation of each component. For example, when the power usage plan for the interval [t0, t1] is greater than total power draw of location sensor, cellular communication interface, and the short range wireless communication protocol interface with all components set to high energy mode (e.g. this could happen on a very sunny day), then, each of these components is set to operate in a high energy mode. This configuration scenario of the component of the gateway system 110, enable the location sensor to return more precise location data, the cellular interface to transmit data at a higher frequency, and the short range interface to listen to packets for a longer duration.

In another example, when the power usage plan for the interval [t2, t3] is less than total power draw of location sensor, cellular communication interface, and the short range wireless communication protocol interface with all components set to high energy mode (this situation can occur at nighttime, for example), the energy mode of operation of at least one of the components is changed to a low energy mode. For example, based on a given priority order, one or more of the location sensor, the cellular interface and the short-range interface are configured to operate in a low power mode. This may reduce the precision of the location readings received from the location sensor 103, reduce the frequency by which data is transmitted to the management server 140 through the cellular interface, and/or reduce the duration by which the gateway system 110 listens to paired devices through the short-range interface.

The example above is presented for illustration purposes and is not intended to be limitative. Different scenarios, configurations modes, and energy modes of operations can be contemplated without departing from the scope of the present embodiments. The example above illustrate the adaptability of the power consumption of the gateway system 110 based on the solar profile that is determined for a given interval of time.

Referring back to FIG. 3, the adaptive power usage manager 105 can also include a power level monitor 320. The power level monitor 320 is operative to receive the solar profile and the current power level generated by the solar power source, operation 10, and determine whether the current power level generated is less than the expected power level indicated by the solar profile at a given time t. When the current power level is less than the expected power level, the power level monitor 320 may transmit an alert to the management server 140. The alert enables the system owner/administrator to perform maintenance on the deployed systems by identifying solar power sources with unexpected power level production.

The adaptive power usage manager 105 also includes a power measures reporter 330. The power measures reporter 330 receives, operation 10, the power level generated by the solar power source at a given time t, the location reading (operation 12) indicating the location the gateway system 110 at the time t, and transmits them (operation 13) to the management server 140. The management server 140 records the received information as a power measure in the recorded power measures information 220.

In some embodiments, the transmission of the power measures is performed at a regular interval of time (e.g., once a second, once a minute, once an hour, once a day, etc.). The frequency of the transmission of the power measures can depend on the energy mode on which the components of the gateway system 110 are operating. For example, when a communication interface that couples the gateway system 110 with the management server 140 is running on a low energy mode, the transmission of the power measures may be performed less frequently than when the communication interface runs on a high energy mode. In some embodiments, the gateway system 110 does not transmit the power measures.

Figure 4:
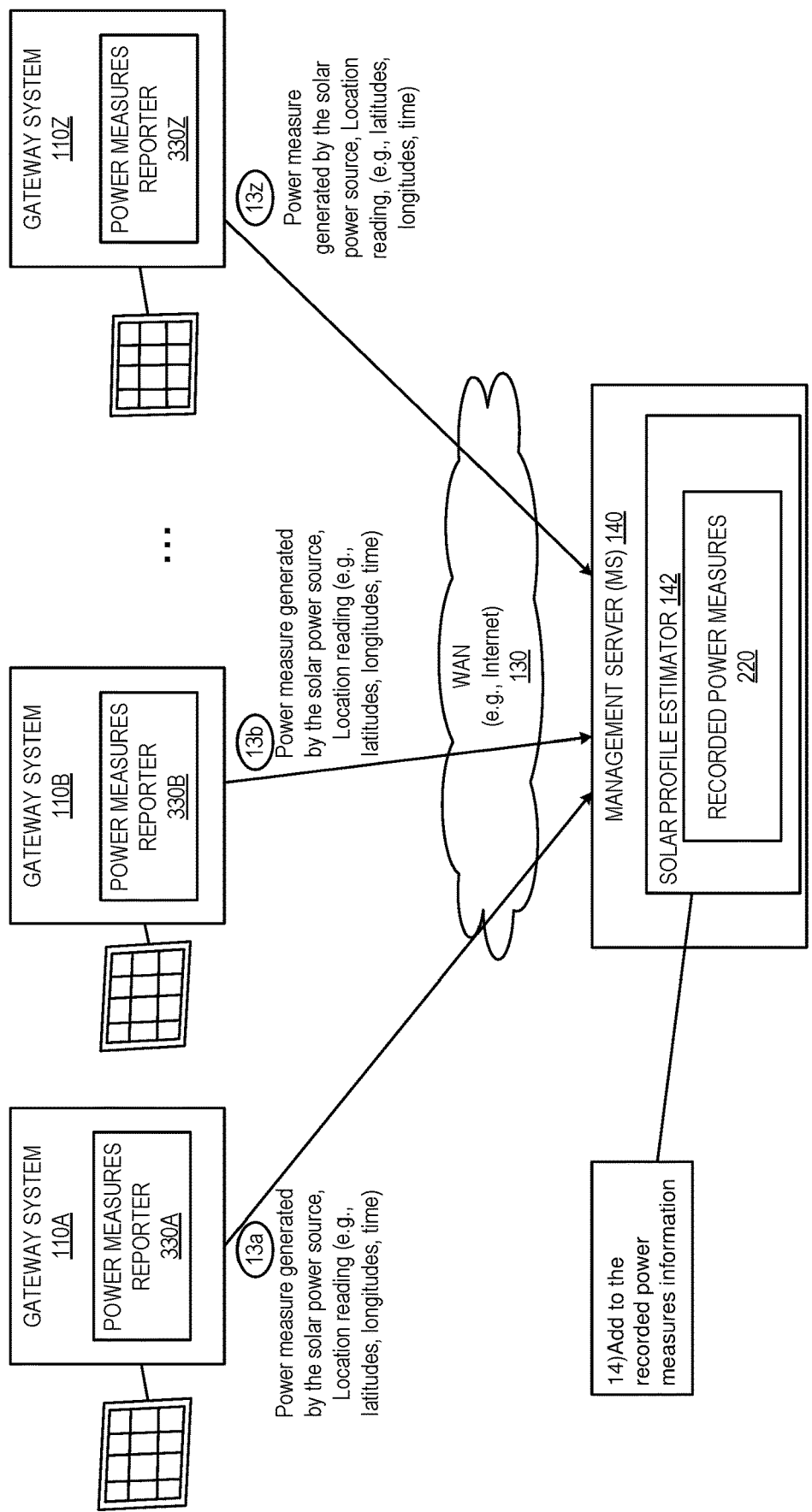
FIG. 4 illustrates a block diagram of a system for receiving power measures, in accordance with some embodiments.

In some embodiments, the management server 140 continuously receives power measures from multiple gateway systems at various locations and populates the recorded power measures information 220. FIG. 4 illustrates a block diagram of a system for receiving power measures, in accordance with some embodiments. Each of the gateway systems 110A-Z includes a respective power measures reporter 330A-Z. Each of the power measures reporter 330A-Z is operative to transmit a power measure generated by the solar power source at a given time t and an associated location reading for that time (e.g., latitudes, longitudes, time t). The management server 140 receives power measures from each gateway system 110 that are mounted on mobile assets part of a fleet of assets. The power measures may be recorded at different times of the day, different locations, and transmitted at various frequencies. The power measures are added (operation 14) by the management server 140 to recorded power measures information 220. Obtaining the power measures from multiple gateway devices, enable the management server to determine a solar profile for the gateway system 110 at the location even if the gateway system has never been located in that location before.

The operations in the flow diagrams of FIGS. 5-7 will be described with reference to the exemplary embodiments of FIGS. 1-4. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 5 illustrates a flow diagram of exemplary operations for enabling adaptive power management in a battery powered gateway system based on expected solar energy level, in accordance with some embodiments. In some embodiments, the operations of FIG. 5 are performed by the management server 140 when coupled with the gateway system 110. In some embodiments, these operations are performed at a regular interval of time (e.g., once an hour, once a day, etc.). The frequency of the operations can depend on the energy mode on which the components of the gateway system 110 are operating. For example, when a communication interface that couples the gateway system 110 with the management server 140 is running on a low energy mode, the operations may be performed at a smaller frequency than when the communication interface runs on a high energy mode. In some embodiments, the operations of FIG. 5 can be triggered by an event within the gateway system 110. For example, a detection that a solar profile received indicates an expected power to be generated by the solar power source 120 at a time t greater than the actual power generated by the solar power source 120 at that time t, can cause the gateway system 110 to request a new solar profile and potentially update its power usage plan.

At operation 510, the management server 140 receives, from the gateway system 110 powered by a rechargeable battery 102 that is coupled with a solar power source 120, a location reading indicating a location of the gateway system at a first time. At operation 520, the management server 140 determines a solar profile indicating a measure of the power expected to be generated by the solar power source at the location during an interval of time that occurs after the first time, and transmits, at operation 530, the solar profile to the gateway system 110 causing the gateway system to determine based on a current battery level of the rechargeable battery and the solar profile an optimal power usage plan for the gateway system and to operate according to the optimal power usage plan during the interval of time.

FIG. 6 illustrates a flow diagram of exemplary operations for determining a solar profile indicating a measure of the power expected to be generated by the solar power source at the location during an interval of time, in accordance with some embodiments. At operation 610, the management server 140 determines, based on the location of the gateway system, one or more power measures previously recorded. In some embodiments, the power measures previously recorded were recorded, 612, within a predetermined radius of the location of the gateway system 110 and within a predetermined time range of a start time of the interval of time. In some embodiments, the power measures previously recorded were recorded, 614, at one or more locations that have an associated solar index that is equivalent to a solar index of the location of the gateway system. In some embodiments, the locations with an equivalent solar index are at a same latitude as the location of the gateway system 110. In some embodiments, the power measures may include power measures recorded within a predetermined radius of the location of the gateway system 110 and within a predetermined time range of a start time and power measures with an associated solar index that is equivalent to a solar index of the location of the gateway system.

The flow then moves to operation 620, at which the management server 140 determines, based on a forecasting model and the one or more power measures previously recorded, power measures expected to be generated by the solar power source during the interval of time. In some embodiments, the flow of operations further moves to optional operation 630, at which, the management server 140 determines for each one of the one or more power measures expected to be generated by the solar power source an associated certainty coefficient.

Figure 7:
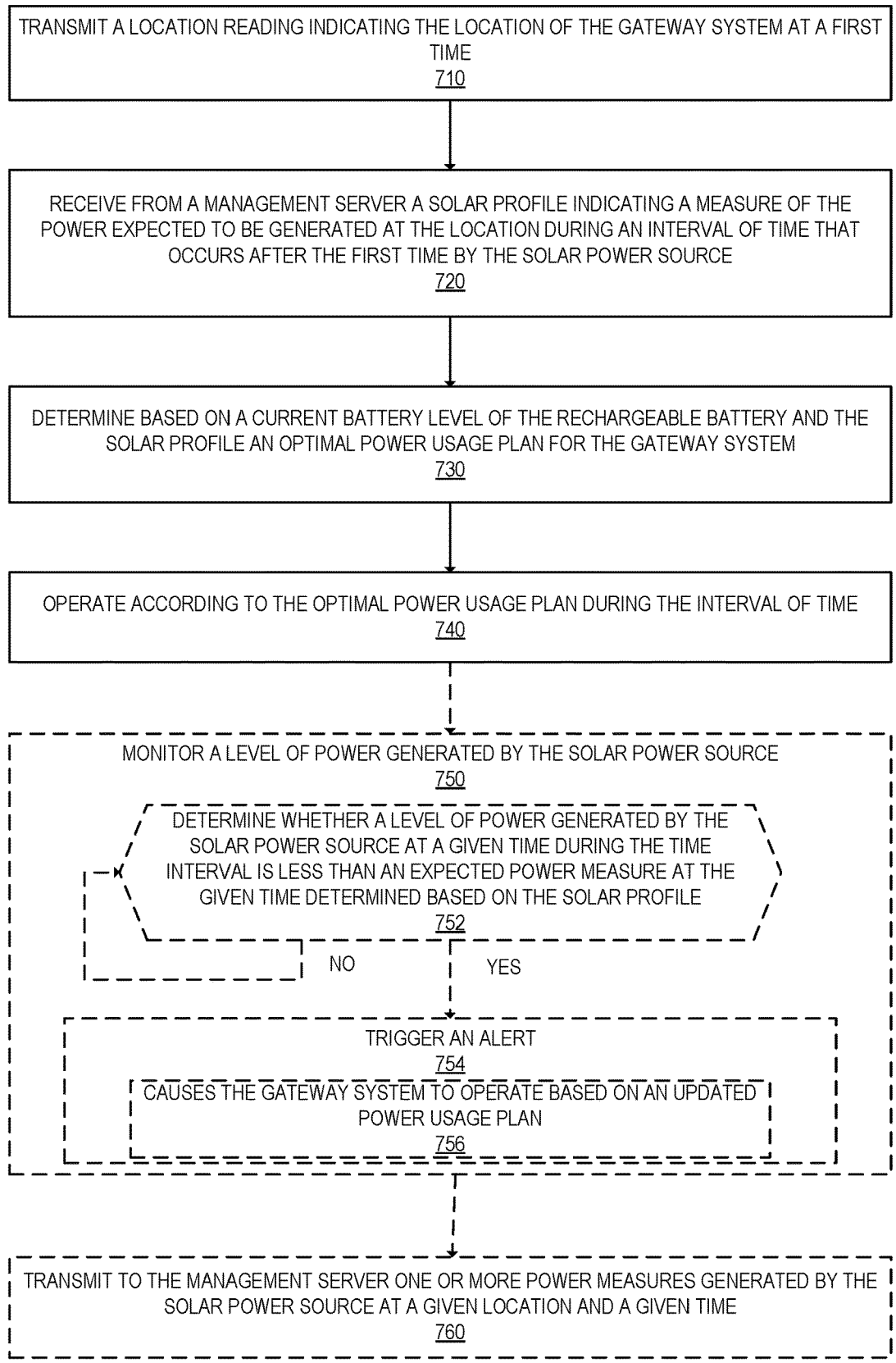
FIG. 7 illustrates a flow diagram of exemplary operations for enabling adaptive power management in a battery powered gateway system based on expected solar energy level, in accordance with some embodiments.

FIG. 7 illustrates a flow diagram of exemplary operations for enabling adaptive power management in a battery powered gateway system based on expected solar energy level, in accordance with some embodiments. The operations of FIG. 7 are performed in a gateway system (e.g., gateway system 110). In some embodiments, these operations are performed at a regular interval of time (e.g., once an hour, once a day, etc.). The frequency of the operations can depend on the energy mode on which the components of the gateway system 110 are operating. For example, when a communication interface that couples the gateway system 110 with the management server 140 is running on a low energy mode, the operations may be performed at a smaller frequency than when the communication interface runs on a high energy mode. In some embodiments, the operations of FIG. 7 can be triggered by an event within the gateway system 110. For example, a detection that a solar profile received indicates an expected power to be generated by the solar power source 120 at a time t greater than the actual power generated by the solar power source 120 at that time t, can cause the gateway system 110 to request a new solar profile and potentially update its power usage plan.

At operation 710, the gateway system 110 transmits a location reading indicating the location of the gateway system at a first time. At operation 720, the gateway system 110 receives from a management server (e.g., management server 140) a solar profile indicating a measure of the power expected to be generated at the location during an interval of time that occurs after the first time by the solar power source. At operation 730, the gateway system 110 determines based on a current battery level of the rechargeable battery and the solar profile an optimal power usage plan for the gateway system. Flow moves to operation 740, at which the gateway system 110 operates according to the optimal power usage plan during the interval of time (e.g., [t0, t1]). In some embodiments, the optimal power usage plan ensures that the gateway system operates during the interval of time above a predetermined minimum energy threshold. The optimal power usage plan ensures that the power stored in the battery of the gateway system is used in a most efficient manner taking into account the expected power to be generated by the solar power system 120 in the future. In some embodiments, the optimal power usage plan causes the battery of the gateway system to be charged while maintaining operation of the gateway system. In other embodiments, the optimal power usage plan causes the battery of the gateway system to be depleted. While in some embodiments, the gateway system 110 is further to perform operations 750 and 760, in other embodiments, these operations are skipped.

Architecture

The gateway systems and the management server described with reference to FIGS. 1-7 are electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 8:
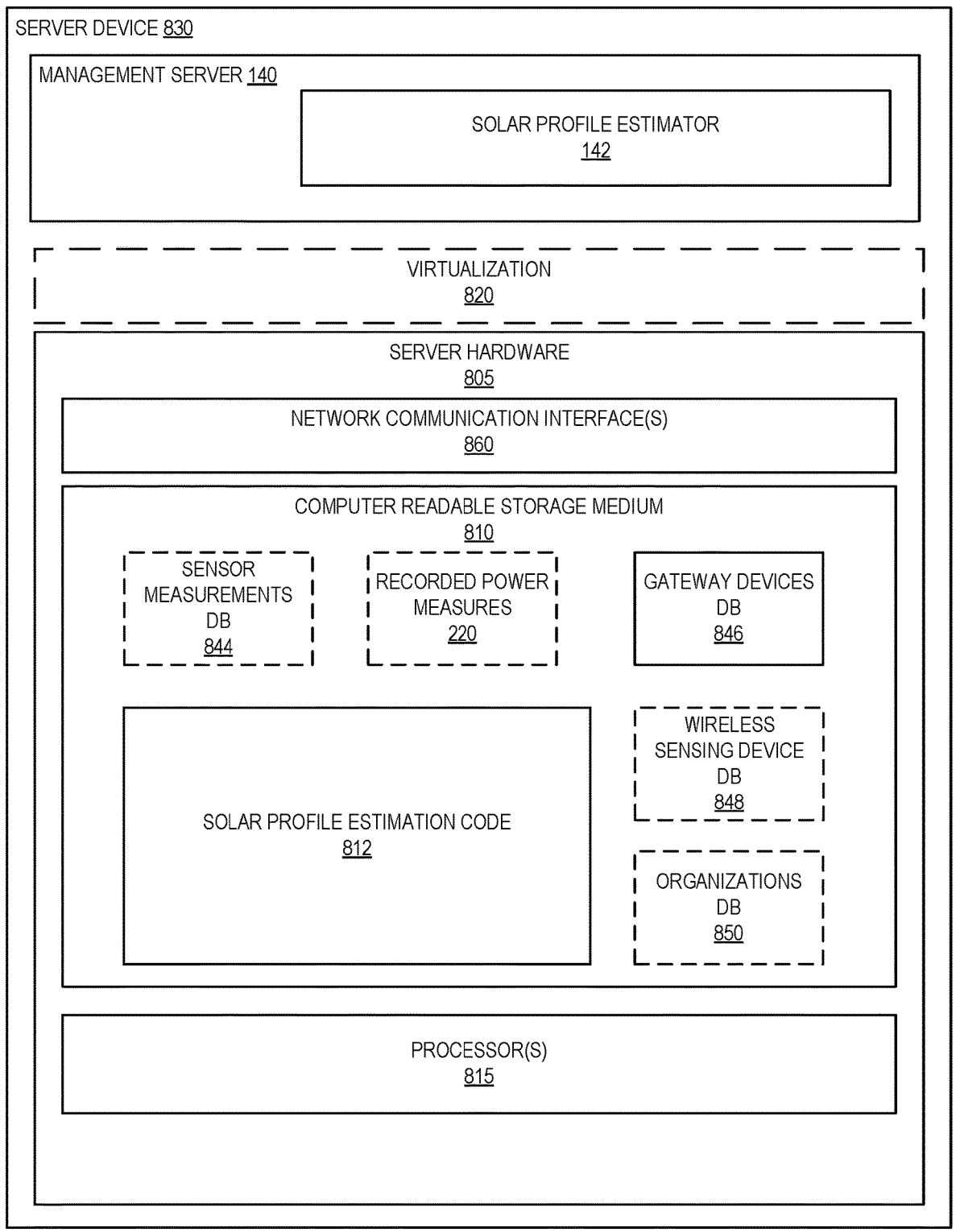
FIG. 8 illustrates a block diagram for an exemplary server management that can be used in some embodiments.

FIG. 8 illustrates a block diagram for an exemplary server management that can be used in some embodiments. Management server 140 may be a Web or cloud server, or a cluster of servers, running on server hardware. In one embodiment, the management server 140 works for both single and multi-tenant installations, meaning that multiple organizations with different administrators may have wireless sensing devices and gateway systems managed by the same management server.

According to one embodiment, management server 140 is implemented on a server device 830, which includes server hardware 805. Server hardware 805 includes network communication interfaces 860 coupled with a computer readable storage medium 810. The computer readable storage medium 810 includes solar profile estimator code 812 which when executed by the processor(s) 815 cause the management server 140 to perform the operations described with reference to FIGS. 1-7. The computer readable storage medium 810 includes an optional sensor measurements database 844 (including sensor measurements obtained from one or more sensors coupled with a gateway system), an optional organizations database 850 (including information regarding the organizations to which the gateway systems, or the mobile assets belong); a gateway systems database 846 (including information regarding the gateway systems), a wireless sensing device database 848 (including information regarding the WSDs). In some embodiments, the computer readable storage medium 810 also stores the recorded power measures 220.

While one embodiment does not implement virtualization, alternative embodiments may use different forms of virtualization—represented by a virtualization layer 820. In these embodiments, the management server 140 and the hardware that executes it form a virtual management server, which is a software instance of the modules stored on the computer readable storage medium 810.

Figure 9:
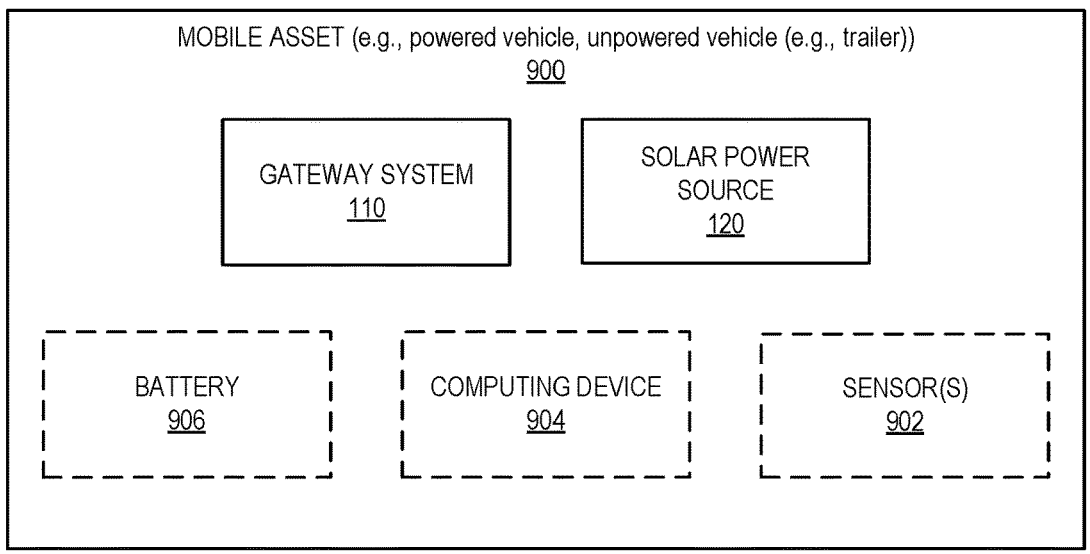
FIG. 9 illustrates a block diagram of an exemplary mobile asset that can be used in some embodiments.

FIG. 9 illustrates a block diagram of an exemplary vehicle that can be used in some embodiments. Mobile asset 900 includes a gateway system 110 coupled with a solar power source 120. In some embodiments, the mobile asset may also include a computing device 904. The computing device is an electronic device installed by the manufacturer of the mobile asset. The mobile asset 900 may include one or more sensors 902 and a battery 906 that can be installed by the manufacturer of the vehicle or aftermarket sensors. The sensors are electronic devices operative to record and transmit data through the gateway system 110 towards a management server 140.

Figure 10:
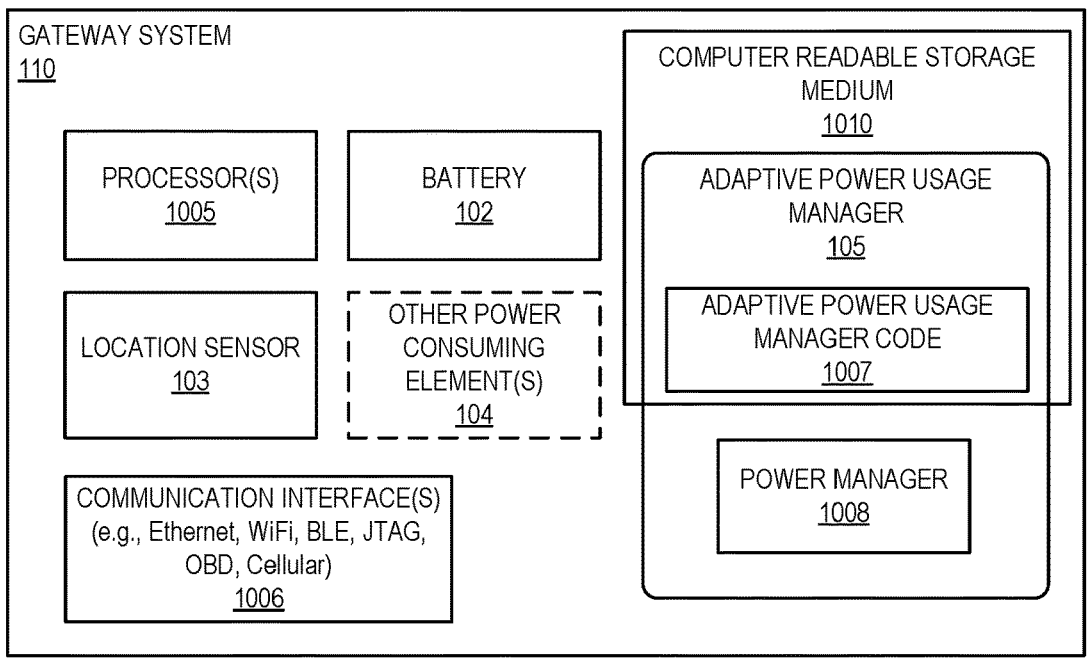
FIG. 10 illustrates a block diagram of an exemplary gateway system that can be used in some embodiments.

FIG. 10 illustrates a block diagram of an exemplary gateway system that can be used in some embodiments. Gateway system 110 includes one or more processors 1005 and connected system components (e.g., multiple connected chips). The gateway system 110 includes computer readable storage medium 1010, which is coupled to the processor(s) 1005. The computer readable storage medium 1010 may be used for storing data, metadata, and programs for execution by the processor(s) 1005. For example, the depicted computer readable storage medium 1010 may store adaptive power usage manager code that, when executed by the processor(s) 1005, in combination with the hardware component power manager 1008 causes the gateway system 110 to perform operations as described with reference to the embodiments of FIGS. 1-7.

The gateway system 110 also includes one or more sensors used to record sensor measurements in response to physical events. For example, the gateway system 110 may include a location sensor (such as a GPS sensor) 103 for recording location readings to indicate the location of the gateway system. The gateway system 110 may include one or more other power consuming elements 104 (e.g., other sensors (e.g., an accelerometer)).

The gateway system 110 also includes one or more communication interfaces 1006, which are provided to allow a user to provide input to, receive output from, and otherwise transfer data to and from the gateway system. Exemplary Input/Output devices and interfaces 1006 include wired and wireless transceivers, such as Joint Test Action Group (JTAG) transceiver, a Bluetooth Low Energy (LE) transceiver, an IEEE 802.11 transceiver, an infrared transceiver, a wireless cellular telephony transceiver (e.g., 2G, 3G, 4G), or another wireless protocol to connect the gateway system 110 with another device, external component, or a network and receive stored instructions, data, tokens, etc. The gateway system also includes a battery 102. The battery is a rechargeable battery coupled with a solar power source. In some embodiments, the solar power source can be part of the gateway system 110. In some embodiments, some components of the gateway system 110 can be external to the gateway system (e.g., the battery, can be an additional battery coupled with the solar power source and operative to transfer power to the gateway system 110). It will be appreciated that one or more buses may be used to interconnect the various components shown in FIG. 10.

Figure 11:
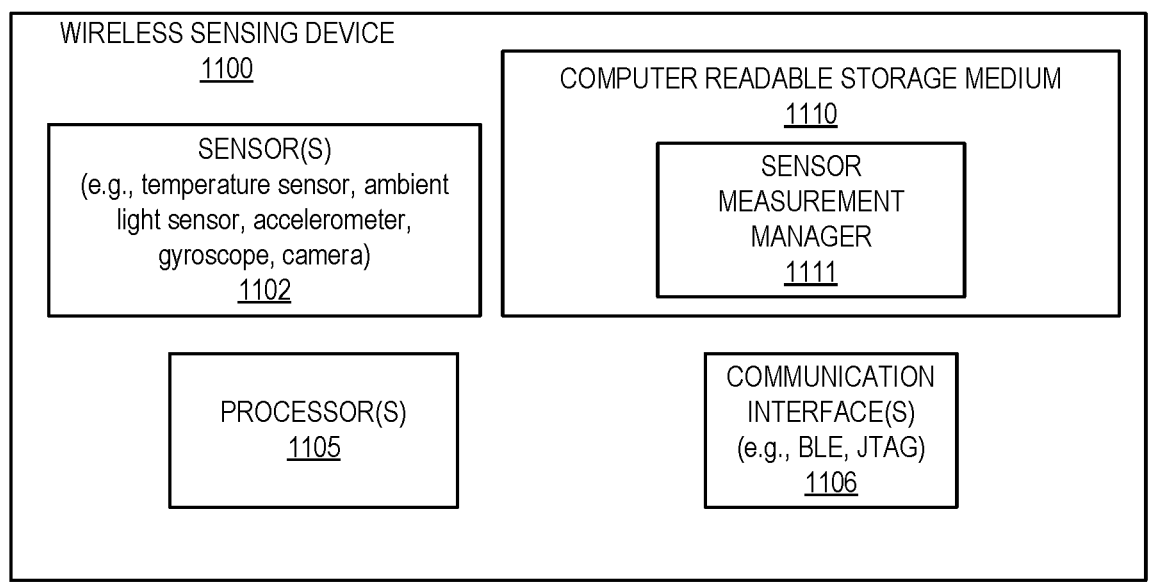
FIG. 11 illustrates a block diagram of an exemplary wireless sensing device that can be used in some embodiments.

FIG. 11 illustrates a block diagram of an exemplary wireless sensing device that can be used in some embodiments. Wireless sensing device 1100 includes one or more processors 1105 and connected system components (e.g., multiple connected chips). The wireless sensing device 1100 includes computer readable storage medium 1110, which is coupled to the processor(s) 1105. The computer readable storage medium 1110 may be used for storing data, metadata, and programs for execution by the processor(s) 1105. For example, the depicted computer readable storage medium 1110 may store sensor measurement management module 1111 that, when executed by the processor(s) 1105, causes the WSD 1100 to offload data to a gateway system to be transmitted to the management server.

In some embodiments, the sensor measurement management module 1111 may cause the WSD to adapt a rate at which it generates sensor measurements based on feedback received from the gateway system 110 and the power usage plan of the gateway system 110.

The WSD 1100 also includes one or more sensor(s) to detect physical events and store sensor measurements in the computer readable storage medium 1110 in response to the detection of the physical events. In some exemplary embodiments, the one or more sensor(s) include at least one of a temperature sensor, an ambient light sensor, an accelerometer, and a gyroscope, etc.

The WSD 1100 also includes one or more communication interfaces 1106, which are provided to allow a user to provide input to, receive output from, and otherwise transfer data to and from the WSD. Exemplary Input/Output devices and interfaces 1106 include wired and wireless transceivers, such as Joint Test Action Group (JTAG) transceiver, a Bluetooth Low Energy (LE) transceiver, an IEEE 802.11 transceiver, an infrared transceiver, a wireless cellular telephony transceiver (e.g., 2G, 3G, 4G), or another wireless protocol to connect the WSD 1100 with another device, external component, or a network and receive stored instructions, data, tokens, etc. It will be appreciated that one or more buses may be used to interconnect the various components shown in FIG. 11.

It will be appreciated that additional components, not shown, may also be part of the management device 140, the mobile asset 900, the gateway system 110, or the WSD 1100 and, in certain embodiments, fewer components than that shown in FIGS. 8-11 may also be used.

While some components of the gateway system, or the management server are illustrated as code stored on the computer readable storage medium, in other embodiments the modules may be implemented in hardware or in a combination of hardware and software. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in a management server located in the cloud, of enabling adaptive power management in a gateway system that is mounted on a mobile asset, the method comprising:
   receiving, from the gateway system powered by a rechargeable battery that is coupled with a solar power source, a location reading indicating a location of the gateway system at a first time;
   determining, at the management server, a solar profile indicating a measure of power expected to be generated by the solar power source at the location of the gateway system during an interval of time that occurs after the first time, wherein the determining the solar profile includes:
      determining, based on the location of the gateway system, power measures previously recorded by another gateway system, and
      determining, based on a forecasting model and the power measures previously recorded, one or more power measures expected to be generated by the solar power source during the interval of time; and
   transmitting the solar profile from the management server to the gateway system causing the gateway system to determine based on a current battery level of the rechargeable battery and the solar profile an optimal power usage plan for the gateway system and causing the gateway system to use the optimal power usage plan for determination of configuration parameters of one or more components of the gateway system, and wherein the configuration parameters include at least one of frequency of measurements to be recorded by at least one of the components of the gateway system, duration of the measurements, and precision of the measurements.

2. The method of claim 1, wherein determining the solar profile further includes:
   determining for each one of the one or more power measures expected to be generated by the solar power source an associated certainty coefficient.

3. The method of claim 1, wherein the power measures previously recorded were recorded within a predetermined radius of the location of the gateway system and within a predetermined time range of a start time of the interval of time.

4. The method of claim 1, wherein the power measures previously recorded were recorded at one or more locations that have an associated solar index that is equivalent to a solar index of the location of the gateway system.

5. The method of claim 1, wherein the mobile asset has an unreliable access to a power source.

6. A management server device located in the cloud for enabling adaptive power management in a gateway system that is mounted on a mobile asset, the management server device comprising:
   a non-transitory computer readable storage medium to store instructions; and
   a processor coupled with the non-transitory computer readable storage medium to process the stored instructions to:
      receive, from the gateway system powered by a rechargeable battery that is coupled with a solar power source, a location reading indicating a location of the gateway system at a first time,
      determine, at the management server, a solar profile indicating a measure of power expected to be generated by the solar power source at the location of the gateway system during an interval of time that occurs after the first time, wherein to determine the solar profile includes to:
         determine, based on the location of the gateway system, power measures previously recorded by another gateway system, and
         determine, based on a forecasting model and the power measures previously recorded, one or more power measures expected to be generated by the solar power source during the interval of time, and
      transmit the solar profile from the management server to the gateway system causing the gateway system to determine based on a current battery level of the rechargeable battery and the solar profile an optimal power usage plan for the gateway system and causing the gateway system to use the optimal power usage plan for determination of configuration parameters of one or more components of the gateway system, and wherein the configuration parameters include at least one of frequency of measurements to be recorded by at least one of the components of the gateway system, duration of the measurements, and precision of the measurements.

7. The management server device of claim 6, wherein to determine the solar profile further includes to:
   determine for each one of the one or more power measures expected to be generated by the solar power source an associated certainty coefficient.

8. The management server device of claim 6, wherein the power measures previously recorded were recorded within a predetermined radius of the location of the gateway system and within a predetermined time range of a start time of the interval of time.

9. The management server device of claim 6, wherein the power measures previously recorded were recorded at one or more locations that have an associated solar index that is equivalent to a solar index of the location of the gateway system.

10. The management server device of claim 6, wherein the mobile asset has an unreliable access to a power source.

11. The method of claim 1, wherein the determining, based on the location of the gateway system, the power measures previously recorded by the another gateway system includes:
   determining whether there is a power measure that was previously recorded within a predetermined radius of the location of the gateway system and within a predetermined time range of a start time of the interval of time;
   responsive to determining that there is at least one power measure that was previously recorded within the predetermined radius of the location of the gateway system and within the predetermined time range of the start time of the interval of time, selecting the at least one power measure as part of the power measures previously recorded; and responsive to determining that there is no power measure that was previously recorded within the predetermined radius of the location of the gateway system and within the predetermined time range of the start time of the interval of time, selecting power measures previously recorded at locations that have an associated solar index that is equivalent to a solar index of the location of the gateway system as part of the power measures previously recorded.

12. The method of claim 1, wherein each of the power measures previously recorded is associated with additional information including one or more of a type of solar power source that generated the power measure previously recorded, an age of the solar power source, a location of the solar power source on the mobile asset, and an orientation of the solar power source; and wherein the determining, based on the location of the gateway system, the power measures previously recorded by the another gateway system is further based on the additional information associated with each of the power measures previously recorded.

13. The gateway system of claim 6, wherein to determine, based on the location of the gateway system, the power measures previously recorded by the another gateway system from the gateway system includes to:

determine whether there is a power measure that was previously recorded within a predetermined radius of the location of the gateway system and within a predetermined time range of a start time of the interval of time;

responsive to determining that there is at least one power measure that was previously recorded within the predetermined radius of the location of the gateway system and within the predetermined time range of the start time of the interval of time, select the at least one power measure as part of the power measures previously recorded; and responsive to determining that there is no power measure that was previously recorded within the predetermined radius of the location of the gateway system and within the predetermined time range of the start time of the interval of time, select power measures previously recorded at locations that have an associated solar index that is equivalent to a solar index of the location of the gateway system as part of the power measures previously recorded.

14. The gateway system of claim 6, wherein each of the power measures previously recorded is associated with additional information including one or more of a type of solar power source that generated the power measure previously recorded, an age of the solar power source, a location of the solar power source on the mobile asset, and an orientation of the solar power source; and wherein to determine, based on the location of the gateway system, the power measures previously recorded by the another gateway system is further based on the additional information associated with each of the power measures previously recorded.

\* \* \* \* \*